(12) United States Patent
Burke

(10) Patent No.: US 6,500,340 B1
(45) Date of Patent: *Dec. 31, 2002

(54) PASTEURIZING SLUDGE TO EXCEPTIONAL QUALITY

(75) Inventor: Dennis A. Burke, Olympia, WA (US)

(73) Assignee: Western Environmental Engineering Company, Olympia, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,931

(22) Filed: May 25, 2000

Related U.S. Application Data

(63) Continuation-in-part of application No. 09/354,967, filed on Jul. 16, 1999, now Pat. No. 6,113,789.
(60) Provisional application No. 60/093,485, filed on Jul. 20, 1998.

(51) Int. Cl.⁷ ................................................. C02F 3/00
(52) U.S. Cl. ............... 210/601; 210/609; 210/613; 210/764; 210/603; 210/604; 210/774
(58) Field of Search ............... 210/607, 631, 210/749, 605, 758, 760, 761, 601, 609, 613, 764, 603, 604, 774

(56) References Cited

U.S. PATENT DOCUMENTS

| | | | |
|---|---|---|---|
| 3,959,125 A | * | 5/1976 | Teletzke ............ 210/603 |
| 4,289,625 A | | 9/1981 | Tarman et al. |
| 4,295,571 A | | 10/1981 | Meyer |
| 4,609,469 A | | 9/1986 | Keoteklian |
| 4,710,300 A | | 12/1987 | Kristoufek |
| 5,015,384 A | | 5/1991 | Burke |
| 5,370,801 A | * | 12/1994 | Sorensen |
| 5,405,536 A | | 4/1995 | Christy |
| 5,422,015 A | | 6/1995 | Angell et al. |
| 5,451,319 A | * | 9/1995 | Kobayashi ............ 224/250 |
| 5,482,528 A | | 1/1996 | Angell et al. |
| 5,540,839 A | | 7/1996 | Pirt |
| 5,670,047 A | | 9/1997 | Burke |
| 5,746,919 A | | 5/1998 | Dague et al. |
| 5,785,852 A | * | 7/1998 | Rivard |
| 5,888,453 A | | 3/1999 | Luker |
| 6,051,145 A | * | 4/2000 | Griffith |
| 6,103,191 A | * | 8/2000 | Luker |
| 6,221,261 B1 | * | 4/2001 | Boss |
| 2001/0025114 A1 | * | 9/2001 | Biji et al. ............ 554/224 |

FOREIGN PATENT DOCUMENTS

| | | |
|---|---|---|
| DE | 34 05 236 | 8/1985 |
| EP | 0 034 872 | 9/1981 |
| EP | 0 078 919 | 5/1983 |
| FR | 2240890 | 3/1975 |
| FR | 2 531 070 | 2/1984 |

OTHER PUBLICATIONS

Ward, A., "Preventing Growth of Pathogens in Pasteurized Digester Biosolids", Oct. 1997, presentation.

Ward, A., H.D. Stensel, J.F. Ferguson, G. Ma, S. Hummel, "Preventing Growth of Pathogens in Pasteurized Digester Biosolids", Published in Waster Environment Research, vol. 71, No. 2, Mar./Apr. 1999.

Burke, D.A. "Nothing Wasted", Published in Civil Engineering, Jun. 1998.

Burke, D.A. "The AGF Process", A brochure, Jan. 2000.

\* cited by examiner

*Primary Examiner*—Chester T. Barry
(74) *Attorney, Agent, or Firm*—Christensen O'Connor Johnson Kindness PLLC

(57) ABSTRACT

An anaerobic process in accordance with the present invention includes the step of digesting an organic substrate in a first anaerobic reactor to provide reactor contents comprising solids and liquid products of digestion. The process also includes a step of removing a portion of the reactor contents, and a step of pasteurizing all or part of the removed reactor contents by direct contact with a hot or inhibitory fluid to cause pathogen destruction. The fluid may be in a gaseous or liquid phase and the fluid may have inhibitory effects which causes the organisms to undergo lysis.

46 Claims, 3 Drawing Sheets

PASTEURIZING SLUDGE TO EXCEPTIONAL QUALITY

CROSS-REFERENCE TO RELATED APPLICATIONS

This Application is a continuation in part of application Ser. No. 09/354,967, filed on Jul. 16, 1999, now U.S. Pat. No. 6,113,789, which claims the benefit off U.S. provisional Application Serial No. 60/093,485 filed Jul. 20, 1998.

FIELD OF THE INVENTION

The present invention relates to an anaerobic treatment process for digesting organic substrates and producing residual solids containing reduced concentrations of pathogens. More specifically, this invention pertains to a method of pasteurizing sludge to bring the sludge to within exceptional quality as defined by the Environmental Protection Agency while maximizing solids destruction through the pasteurization.

BACKGROUND OF THE INVENTION

Anaerobic digestion is used to convert a variety of organic materials to gas and soluble constituents. Anaerobic digestion is commonly used to convert a fraction of sewage sludge, animal manure, and other putrid organic slurries containing substantial quantities of pathogenic bacteria, viruses, fungi, and parasites to methane gas and soluble products. Conversion of sewage sludge, or other waste solids to gas and soluble constituents lowers the cost of solids disposal by reducing the mass of solids requiring disposal. Examples of processes that are useful for converting organic materials to gas and soluble constituents include the retained biomass processes described in U.S. Pat. Nos. 5,015,384 and 5,670,047 by the inventor of the subject application. The '384 patent describes a retained biomass process similar to the one illustrated in FIG. 1. In such a process, an influent slurry 1 is delivered at a rate Q to anaerobic reactor 8. Solids, comprising partially digested solids and anaerobic bacteria, and liquid and soluble products of digestion are delivered via line 2 to a separator 9 where the solids are separated from the liquid and soluble products of digestion. The '384 patent describes that the solids are either returned to anaerobic reactor 8 or they can be wasted via line 5 for disposal. Effluent from the separator can be discharged via line 4.

Retained biomass systems substantially improve the economics of anaerobic digestion. The digestor size can be significantly reduced while improving the percent solids converted to gas and soluble products. In a retained biomass system, solids must be wasted from the system on a periodic basis to avoid their undesirable build up. Referring to FIG. 1 and 2, solids can be wasted from separator 9 along line 5 or from the thickened return solids stream 3 shown in FIG. 1. Solids can also be wasted from the digestor 8 or from line 2 as shown in FIG. 2. Typically, it is more economical to waste the concentrated solids from the thickened solids stream 3 or directly from the separator 9 shown in FIG. 1, as compared to wasting the less concentrated digestor solids as shown in FIG. 2.

In addition to the volume and mass of residual waste solids, the cost of disposing waste solids is also influenced by the quality of solids requiring disposal. Solids, which have lower concentrations of bacteria and viral pathogens, can be disposed at less cost than solids containing higher concentrations of pathogenic organisms. Current regulations (EPA-40 CFR Part 503) define Class A or "exceptional quality" biosolids as those waste solids containing a reduced quantity of pathogenic bacteria such as salmonella, and fecal coliform. Class A biosolids can be produced through a variety of means including:

1. Disinfection by holding the waste solids (biosolids) at an elevated temperature (above 50° C.) for a prolonged period of time. Shorter detention times are achieved at higher temperatures. Pasteurization is achieved by retaining the solids or slurry for 30 minutes or more at 70° C. or higher.
2. Raising the pH above 12 for 72 hours at an elevated temperature, or drying to 50% solids concentration.
3. In vessel or aerated composting for three days at 55° C.
4. Windrow composting at 55° C. for 15 days
5. Heat drying at 80° C.
6. Heat treatment of liquid biosolids to 180° C. for 30 minutes.
7. Aerobic thermophilic digestion at 55° C. for 10 days
8. Beta ray irradiation
9. Gamma ray irradiation As can be observed from the list above, the waste biosolids must have the pH or the temperature elevated for prolonged periods of time to achieve the desired pathogen reduction. The cost of achieving the desired pathogen reductions according to the above methods is directly related to:

1. The energy or chemical cost required to elevate and maintain the temperature of the waste biosolids; and
2. The reactor size required to hold the waste solids for the required period of time.

The quantity of chemicals used, the energy required, and holding vessel size, are each dependent on the quantity of solids that must be processed to reduce the pathogen concentration.

Specific methods of producing anaerobically digested "Class A" biosolids include the following processes:

1. Plug flow anaerobic thermophilic digestion or simulated plug flow digestion through a series of completely mixed thermophilic digesters. In this type of process the entire influent flow is heated to thermophilic temperatures. Heat losses from the digestors can be significant, since the volume to surface area required for multiple digestors is low. High effluent organic acids and ammonia concentrations, and the poor dewaterability of the residual solids are significant disadvantages of anaerobic thermophilic digestion or simulated plug flow digestion.
2. Batch pasteurization of the entire influent flow prior to anaerobic digestion is a commonly used practice. However, pasteurization of the entire influent flow prior to anaerobic digestion is expensive since the entire viscous flow must be pasteurized. The procedure requires large quantities of energy for transporting and heating the viscous influent slurry.
3. Thermophilic anaerobic digestion followed by mesophilic anaerobic digestion (Dague, et al. #5,746,919) has been described as useful to achieve Class A biosolids. However, in order to meet the strict requirements of EPA-40 CFR Part 503, in such a process the thermophilic digestor should operate in a plug flow mode to prevent short-circuiting, i.e., passage of a portion of the biosolids without being exposed to the treatment conditions for a sufficient period of time to effect the desired results. Again, with this type of process, the entire flow of biosolid stream must be heated to thermophilic temperatures and maintained at those temperatures for a considerable period of time, generally exceeding 7 days in the thermophilic reactor and 12 days in the mesophilic digestor. Such long retention times and large volumes contribute significantly to the overall cost of the process. In addition, two biomasses, mesophilic and thermophilic, are grown, thus reducing the mass converted to gas while increasing the mass to be disposed.

4. Thermophilic aerobic digestion followed by mesophilic anaerobic digestion also provides a process to achieve Class A biosolids. However, in order to meet the strict requirements of EPA-40 CFR Part 503, in this process the thermophilic aerobic digestor is generally operated in the plug flow mode or as a sequencing batch reactor to prevent short-circuiting. Again the entire flow must be heated to thermophilic temperatures and maintained at those temperatures for a considerable period of time, generally exceeding 5 days in the aerobic reactor, and 12 days in the anaerobic digestor. Costs associated with the heating, transporting and storing the process stream can be significant. In addition, a significant portion of the methane gas generating potential is lost in the aerobic portion of such process.

5. U.S. Pat. No. 5,888,453 describes a continuous flow pasteurization process for sewage sludge. The process described in the '453 patent involves raising the temperature of the sludge by passing the sludge through at least one heat exchanger supplied with a heating fluid. The sludge at the elevated temperature is delivered to a detention tank where it is held above a predetermined temperature for a predetermined period of time to effect pasteurization. The '453 patent describes that the pasteurized sludge can be fed to a second anaerobic reactor for further digestion, followed by delivery to a dewatering system.

There continues to be a need for an energy efficient anaerobic digestion process capable of effectively and efficiently digesting organic substrates and producing residual solids that contain reduced quantities of pathogens so as to be classified as Class A or "exceptional biosolids" by the EPA.

SUMMARY OF THE INVENTION

The present invention provides a method for anaerobically digesting organic substrates and producing residual solids that contain pathogens at a level that allows the residual solids to be classified as Class A biosolids. The method concentrates digested products which reduces the volume of material that must be treated to reduce the pathogen levels. Reducing the volume of material that must be treated provides cost savings associated with reduced energy costs and equipment costs. Direct contact with a hot or inhibitory fluid is relied upon to treat the residual solids to reduce the pathogen levels. Preferably, steam is used as a relatively inexpensive source of heat and also provides a source of fluid to dilute the residual solids so that they can be subsequently treated in an additional anaerobic reactor to further reduce the solids volume. Gases such as air, oxygen, nitrogen, hydrogen, methane, and carbon dioxide may also be used as a source of heat either alone or in combination with other gases. Inhibitory gases such as ammonia, hydrogen sulfide, ozone and in some cases oxygen may be used to cause the pathogens to undergo lysis or used as a heat source alone or in combination with other gases.

An anaerobic process in accordance with the present invention includes the step of digesting an organic substrate in a first anaerobic reactor to provide reactor contents comprising solids and liquid products of digestion. The process includes a step of removing a portion of the reactor contents, and a step of pasteurizing all or part of the removed reactor contents by direct contact with a hot or inhibitory fluid.

In a preferred embodiment of an anaerobic process in accordance with the present invention, the process includes the steps of; digesting an organic substrate in a first anaerobic reactor to provide reactor contents comprising solids and liquid products of digestion, removing a portion of the reactor contents, concentrating the portion of the removed reactor contents by separating liquids, returning concentrated reactor contents to the first anaerobic reactor, pasteurizing any leftover concentrated reactor contents by direct contact with a hot or inhibitory fluid, and digesting the leftover reactor contents that underwent pasteurization in a second anaerobic reactor. In the preferred embodiment, the fluid to bring the leftover concentrated reactor contents to the desired temperature may be either in a gaseous or liquid phase or any combination thereof. If the fluid is in a gaseous phase, the gaseous phase may be either steam, air, nitrogen, oxygen, carbon dioxide, hydrogen, hydrogen sulfide, ozone, methane or ammonia or any combination thereof. If the fluid is in a liquid phase, the liquid phase may be water. The fluid may also have disinfectant chemicals.

In another embodiment of the present invention, the anaerobic process includes the steps of; digesting an organic substrate in a first anaerobic reactor to provide reactor contents having solid and liquid products of digestion, removing a portion of the reactor contents, concentrating removed reactor contents by separating liquids, returning concentrated reactor contents to the first anaerobic reactor and pasteurizing any leftover concentrated reactor contents by direct contact with a hot or inhibitory fluid. During pasteurization, gases such as ammonia or hydrogen sulfide may be given off and reintroduced into the process. Since the pasteurized reactor contents and the gases are substantially in equilibrium, reintroducing part or all of the gases contributes to the heat energy required for pasteurization, thus, conserving energy. In addition, the nature of these gases causes the cells to undergo lysis. In this embodiment, the fluid may have a gaseous or a liquid phase or any combination thereof. If the fluid is in a gaseous phase, the gaseous phase may be either steam, air, nitrogen, oxygen, carbon dioxide, hydrogen, hydrogen sulfide, ozone, methane or ammonia or any combination thereof. If the fluid is in a liquid phase, the liquid phase may be water. The fluid may also have disinfectant chemicals.

Using the processes in accordance with the present invention, exceptional quality, "Class A" biosolids may be achieved efficiently and economically.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
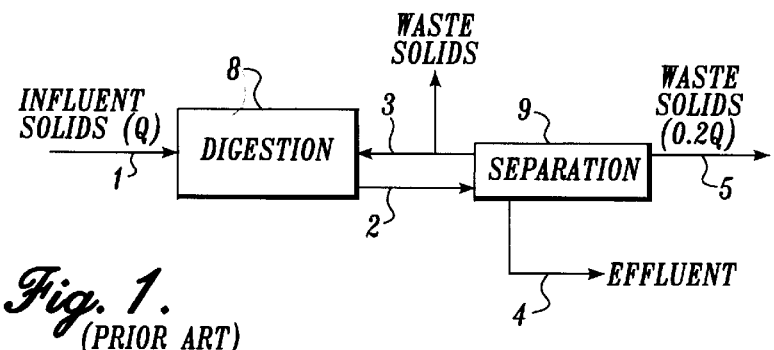
FIG. 1 is a flow diagram of a prior art retained biomass anaerobic digestion process.
Figure 2:
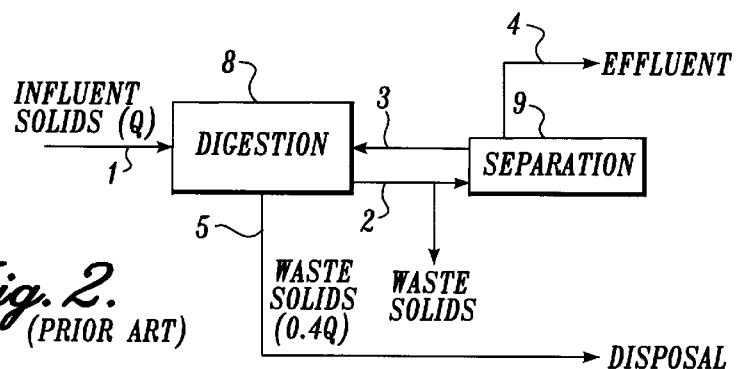
FIG. 2 is a flow diagram of a modification to the prior art retained biomass anaerobic digestion process of FIG. 1.
Figure 3:
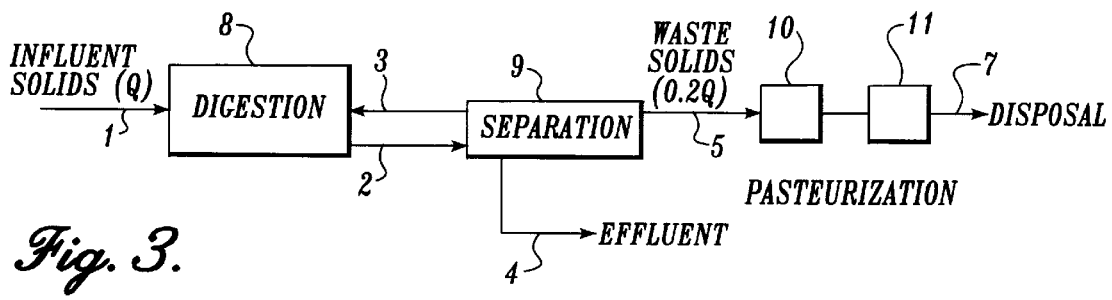
FIG. 3 is flow diagram of a anaerobic digestion process of the present invention.

Referring to FIG. 3 an embodiment of an anaerobic digestion process in accordance with the present invention is illustrated. While the present invention is described with reference to specific embodiments, it should be understood that other arrangements for carrying out the present invention are possible. U.S. Pat. Nos. 5,015,384 and 5,670,047 describe anaerobic digestion processes employing retained biomass and are herein incorporated by reference. In FIG. 3, the solids comprising raw sewage or other waste solids material including organic material are delivered via line 1 to a first anaerobic reactor 8 where the solids are subjected to anaerobic treatment conditions including contact with anaerobic biomass. The raw material may be pretreated by grinding, heat treatment, chemical treatment, or lysing of cellular material. Suitable anaerobic reactors include retained biomass reactors (fixed film, carrier assisted, sequencing batch, UASB, SBR, and the like), completely mixed, plug flow or staged, operated in the mesophilic, thermophilic, psychrophilic modes, or phase separated processes.

The digestion process produces gas, partially digested solids, and liquid products of digestion that include soluble products of digestion. The reactor contents that include solids and liquid products of digestion are removed via line 2 from the anaerobic reactor 8 to a separator 9 where liquid products of the removed reactor contents are separated to provide recycled concentrated reactor contents, which are fed back to anaerobic reactor 8 via line 3, and leftover concentrated reactor contents in line 5 having a solids concentration of about 3 to about 12 weight percent, preferably about 5 to about 10 weight percent. Examples of suitable separators include flotation separators, centrifuges, clarifiers, plate separators, gravity belts, cyclones, membranes, filters, or any number of a variety of solid-liquid separators. In one alternate embodiment, the separator 9 may be part of anaerobic reactor 8, thereby omitting lines 2 and 3. If a retained biomass system is employed for the anaerobic reactor, a greater percentage of the influent solids are converted to gas, rather than anaerobic biomass, since bacteria are retained in the system through the use of a separator 9 and a recycle stream 3. Concentrated reactor contents including solids can be wasted from the system as a leftover concentrate via line 5. By way of example, the volume of stream 5 ranges from about 10 to about 50 percent of the influent volume. The remaining 50 to 90 percent of the volume may be discharged as liquid effluent via line 4.

The process of separating liquids from the first anaerobic reactor's mixed contents not only concentrates the solids, it also removes inhibitory products of digestion from the pasteurization step and second digestion step as described in more detail below. Pasteurization at elevated temperatures enhances the release of inhibitory products of digestion that have not been removed from the digested reactor contents. Although release of inhibitory products such as ammonia and hydrogen sulfide at elevated temperatures enhances pasteurization, it inhibits, and may prevent subsequent anaerobic digestion of the pasteurized solids. Removing the inhibitory products prior to pasteurization reduces the risk that such inhibitory products will have an adverse effect on the digestion of the pasteurized solids. In some alternate embodiments, however, it may be desirable to reintroduce the inhibitory gases such as ammonia and hydrogen sulfide driven off during pasteurization back into the process for energy conservation and to cause the pathogens to undergo lysis.

Leftover concentrated reactor contents in line 5 are delivered to a pasteurization system where the solids are pasteurized to destroy bacteria, viruses, fungi and parasites. Pasteurization consists of two distinct steps; the killing and lysing of organisms (schematically illustrated as occurring at 10) and the storage of the pathogens under destructive conditions for a period of time sufficient to maximize pasteurization (schematically illustrated as occurring at 11). It should be understood that pasteurization 10 and retention 11 may be accomplished in the same vessel or separate vessels, or in a circulation system between vessels. It should also be understood that the separator 9 and pasteurizer 10 and 11 may take place in the same vessel. For example, as in hot or toxic gas flotation.

In accordance with the present invention, organism destruction is preferably accomplished by direct contact between a fluid with the leftover concentrated reactor contents to elevate the temperature to pasteurization temperatures or to cause the pathogens to undergo lysis. By direct contact, it is meant that the fluid and the concentrated reactor contents are intimately mixed with one another. In one alternate embodiment, a hot fluid provides heat primarily by convection, as opposed to conduction. For example, a shell and tube heat exchanger works primarily by conduction because the hot fluid medium does not move into the cold medium. With a heat exchanger heat is transferred by conduction across a barrier wall separating the hot and cold fluids. Hot fluids used in the present invention may include a gas or a liquid phase or both. Gas phase fluids may include but are not limited to steam, air, nitrogen, oxygen, ammonia, methane, ozone, hydrogen sulfide, carbon dioxide, hydrogen, and any biogas given off during the process, or any combination thereof. Liquid phase fluids may include but are not limited to water. For example, disinfecting chemicals may be added to the water. Generally any fluid which is compatible with the process may be used. Hot fluids must also have the requisite amount of thermal energy to raise the temperature to pasteurization levels. Another alternate embodiment uses inhibitory products, such as ammonia, ozone, hydrogen sulfide, and in some cases oxygen as the fluid. These substances are not necessarily hot fluids, but rather achieve organism destruction by causing the organisms to undergo lysis. In the case of oxygen, oxygen may inhibit anaerobic organisms, but not necessarily cause lysis in the pathogens. Some inhibitory compounds are external to the process while others are derived in the process and are recirculated. Still other alternates may use the biogas driven off during the process as part of the fluid. The biogas may include the inhibitory products already mentioned in addition to any other gas derived from the process. These gases may be recirculated as part of the hot fluid that has direct contact with the concentrated reactor contents. Recirculating all or part of the gases driven off during pasteurization is done for the purpose of conserving energy or pathogen destruction. Since the gases are generally in equilibrium with the concentrated reactor contents being pasteurized, the gases potentially have available heat which may be used to preheat freshly introduced concentrated reactor contents, thus conserving energy. The gases may be collected and then all or part reintroduced into the hot fluid stream that directly contacts the reactor contents, or the gases may be introduced via a separate line. After introduction of the hot or inhibitory fluids, the solids can be retained for a predetermined time to effect pasteurization. Retention time can be accomplished through the use of tanks or other vessels such as pipelines.

Direct steam injection is the preferred method as described in U.S. application Ser. No. 09/359,967, which is herein incorporated by reference, since it can be used to dilute the thickened solids to a solids content of less than about 6 percent, preferably less than about 4 percent by weight. At this reduced solids level, the solids can be more easily contacted with the biomass in the subsequent re-digestion step as compared to a substrate having a solids content higher than about 6 weight percent. In addition, steam is a relatively inexpensive source of thermal energy that is usually readily available on site. Steam may be omitted under some circumstances from the hot fluid stream. More recently, it has been discovered that steam is not the only fluid capable of raising the leftover concentrated reactor content temperatures to pasteurization levels. Any of aforementioned fluids may be used with equal success either alone or in any combination thereof.

Figure 4:
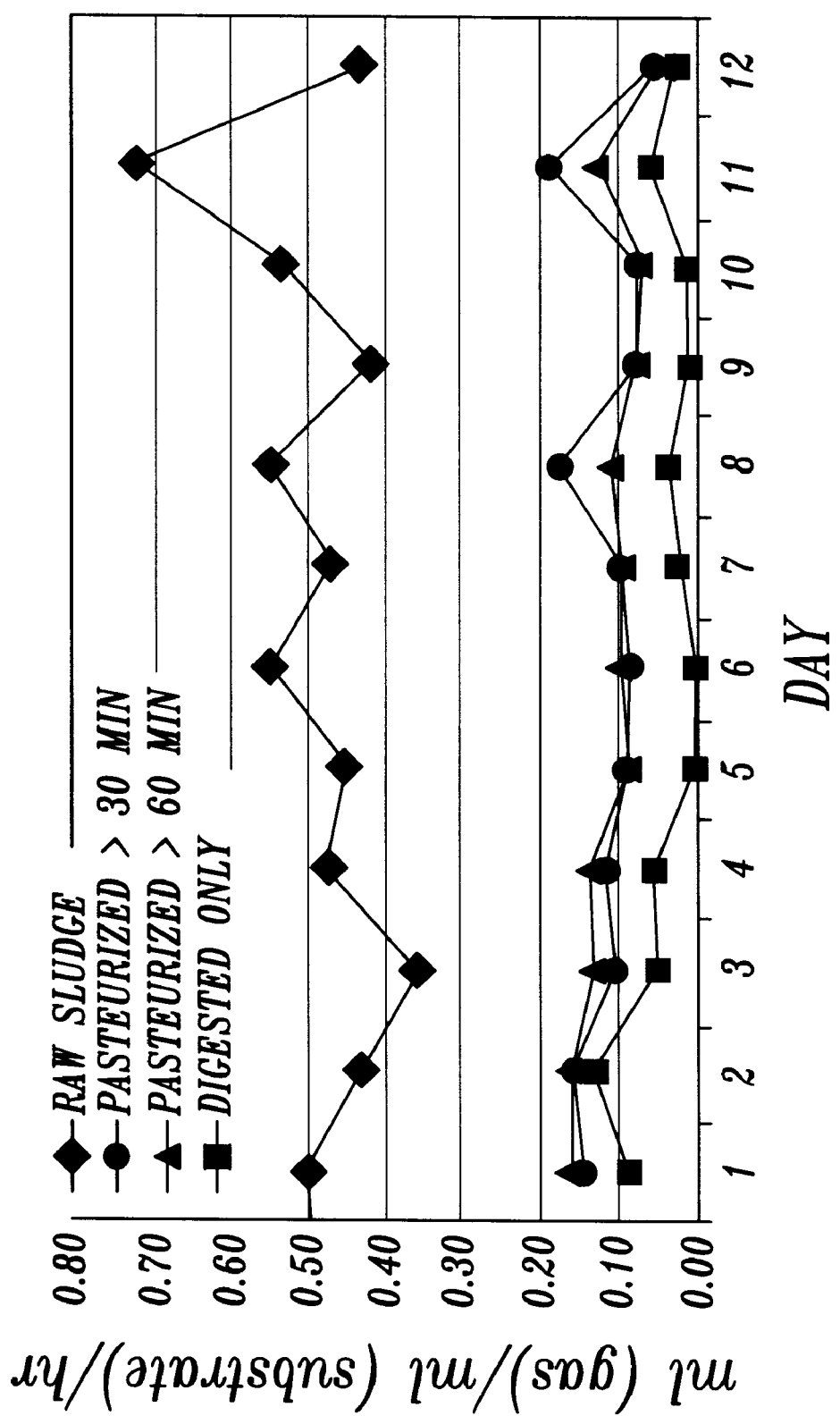
FIG. 4 is a graph illustrating the relative gas production from sludges that have and have not been treated in accordance with the present invention.

While testing the arrangement shown in FIG. 3, it was observed that the pasteurization step produced a residual solids product that had obnoxious odors and was not completely stabilized. It was observed that the pasteurized product could be re-digested to produce a stabilized, reduced odor product containing even less volatile solids. As shown in FIG. 4, it was found that a significant amount of gas could be produced from the pasteurized residual solids product. Calculation of the amount of gas produced indicated that the volatile solids could be reduced an additional 5 to 10 percent or as much as 20 percent through digestion of the pasteurized material. The product produced by re-digestion was found to be fully stabilized.

Figure 5:
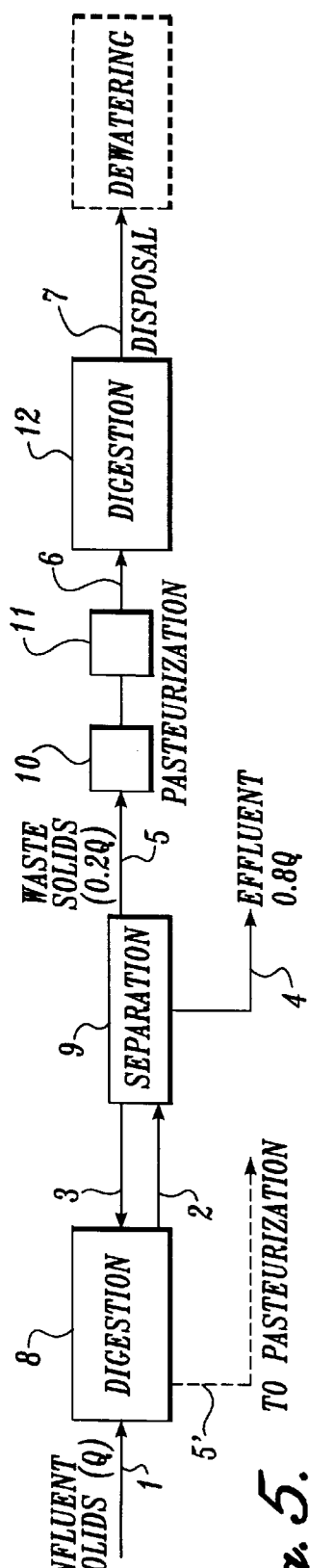
FIG. 5 is a flow diagram of an alternative embodiment of an anaerobic digestion process of the present invention.
Figure 6:
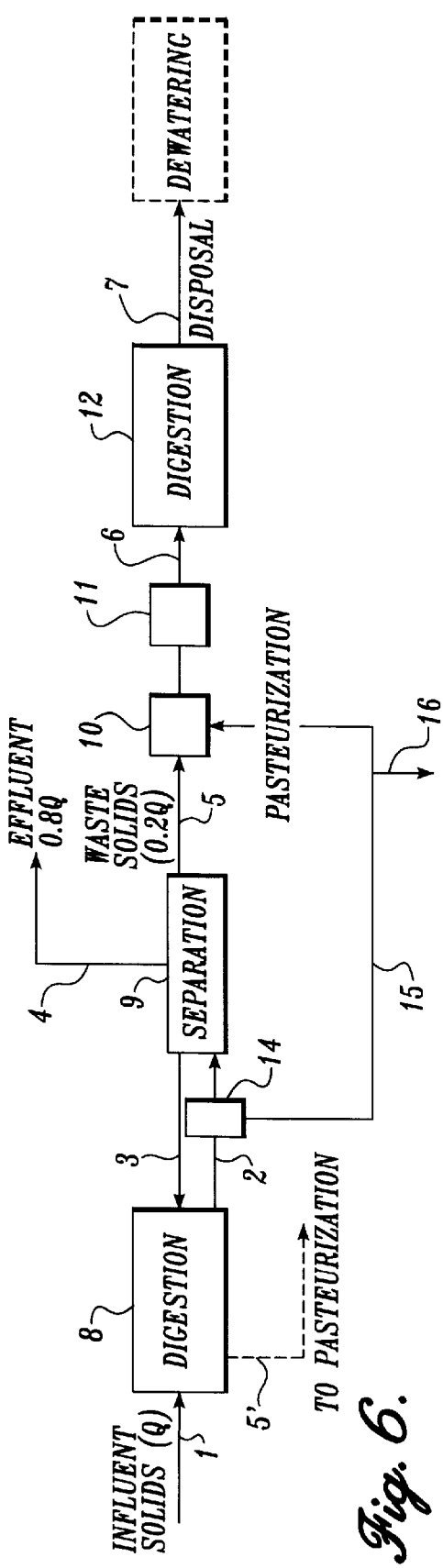
FIG. 6 is a flow diagram of another alternative embodiment of an anaerobic digestion process of the present invention.

An embodiment of the anaerobic digestion process of the subject invention is described below with reference to FIGS. 5 and 6 where the re-digestion system is illustrated.

In the subject process, as described above, waste solids enter a first anaerobic reactor 8 via line 1, where the solids are converted to gas, partially digested constituents, soluble constituents, and anaerobic bacteria. Reactor contents including solids and liquids are removed via line 2. The process preferably includes a separator 9, that concentrates the digested solids in line 2 through liquid separation and recycles a portion of removed concentrated reactor contents to anaerobic reactor 8 via line 3 and then wastes the leftover portion of the solids via line 5. In an alternate of this embodiment, separator 9 and first anaerobic reactor 8 may be contained within the same vessel. Liquid effluent is discharged along line 4 from separator 9. In order to prevent the build-up of inorganic and refractory solids, such solids can be wasted from line 2, or through the less efficient wasting from the anaerobic reactor 8 via line 5'. Optionally, the removed reactor contents in line 5' may also feed the pasteurization system at 10 and 11. The leftover concentrated reactor contents in line 5 coming from the separator 9 are pasteurized at 10 and 11 to effectively destroy the influent pathogens and anaerobic bacteria cultured in the first reactor 8. In an alternate of this embodiment, separator 9 and pasteurizer 10 and 11 may be carried out in the same vessel. The pasteurized slurry is then directed via line 6 to second anaerobic reactor 12 for further digestion. Because the waste solids in line 5 may have been diluted by the hot fluid, the solids content of the slurry is preferably kept to less than about 6, and more preferably less than about 4 weight percent which is a slurry that can be readily mixed and contacted with active biomass in the second anaerobic reactor 12. Second anaerobic reactor preferably contains an anaerobic culture free of pathogens. The second anaerobic reactor can incorporate a second separator (not shown) or inorganic solids removal device (not shown) to improve its efficiency. The solids digested in second anaerobic reactor 12 can be discharged along line 7 or dewatered in a separate dewatering device. The highly concentrated solids produced in reactor 12 can be more easily and effectively dewatered since the solids concentration is higher and more completely stabilized than conventionally digested solids.

The described process is expected to increase the volatile solids destruction from a typical value of 55% in a conventional reactor to 80% or 85% (70% to 80% in reactor 8 and 10% to 15% in reactor 12), while producing a Class A, exceptional quality product for ultimate disposal with little odor.

An alternative embodiment of the present invention is described with reference to FIG. 6. In that process the efficiency of the first anaerobic reactor 8 is improved by removing a portion of the inorganic and refractory organic solids mechanically in separator 14 positioned in line 2. Separator 14 may be any of a series of devices or screens effective in removing inorganic solids and/or refractory organic materials or a combination of both. The refractory organic and inorganic materials may be discharged separately along line 16 or delivered to the pasteurization system along line 15. The inorganic and refractory organic material will not adversely effect the performance of second anaerobic reactor 12 if such reactor is not a retained biomass system.

The inventor observed that the pasteurization process carried out in accordance with the present invention destroyed a significant portion of the anaerobic bacteria and pathogens created, or maintained in the first anaerobic reactor 8. The destroyed bacteria then became substrate for anaerobic bacteria maintained in the second anaerobic reactor 12. Under preferred conditions the anaerobic bacteria maintained in the second anaerobic reactor 12 would be a culture relatively free of pathogens. A much smaller quantity of bacteria must be cultured in the second anaerobic reactor 12 to degrade the substrate delivered to the second anaerobic reactor 12 since the substrate concentration is much lower.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An anaerobic process for digesting organic substrates comprising;

digesting an organic substrate in a first anaerobic reactor to provide reactor contents comprising solids and liquid products of digestion;

removing a portion of the reactor contents;

concentrating removed reactor contents by separating liquids;

returning concentrated reactor contents to the first anaerobic reactor;

pasteurizing leftover concentrated reactor contents by direct contact with a fluid; and digesting all or part of the leftover concentrated reactor contents that underwent pasteurization in a second anaerobic reactor.

2. The process of claim 1, wherein the fluid comprises a gaseous phase.

3. The process of claim 2, wherein the gaseous phase is air, nitrogen, oxygen, methane, ammonia, hydrogen, carbon dioxide, hydrogen sulfide, ozone or biogas.

4. The process of claim 1, wherein the fluid comprises a liquid phase.

5. The process of claim 4, wherein the liquid phase is water.

6. The process of claim 1, wherein the fluid dilutes the leftover concentrated reactor contents to a solids concentration less than about 6 percent by weight.

7. The process of claim 1, wherein chemical disinfectants are added to the fluid to improve pasteurization.

8. The process of claim 1, further comprising the step of removing inorganic or organic refractory solids from the first anaerobic reactor.

9. The process of claim 8, further comprising the step of discharging removed inorganic or organic refractory solids.

10. The process of claim 8, wherein all or part of the removed inorganic or organic refractory solids from the first anaerobic reactor are pasteurized subsequent to their removal from the first anaerobic reactor.

11. The process of claim 1, wherein the first anaerobic reactor comprises a fixed film, sludge bed, sludge blanket, completely mixed, plug flow, phase separated, staged, carrier assisted, batch, or sequencing batch anaerobic reactor.

12. The process of claim 11, wherein the first anaerobic reactor is operated at mesophilic, thermophilic, or psychrophilic temperatures.

13. The process of claim 1, wherein the second anaerobic reactor comprises a fixed film, sludge bed, sludge blanket, completely mixed, plug flow, phase separated, staged, carrier assisted, batch, or sequencing batch anaerobic reactor.

14. The process of claim 1, wherein the liquids are separated from the removed reactor contents in a separator comprising a clarifier, centrifuge, cyclone, plate separator, gravity belt, membrane, filter, flotation separator or a combination of such separators used with or without chemical, mechanical, or electrical flocculating aids.

15. The process of claim 14, wherein the separator and the first anaerobic reactor are contained within the same vessel.

16. The process of claim 1, wherein the step of pasteurizing is carried out in a pasteurization vessel and a retention vessel that may be separate vessels or incorporated into the same vessel.

17. The process of claim 16, wherein the step of concentrating and the step of pasteurizing are carried out in the same vessel.

18. The method of claim 1, wherein the volume of the leftover concentrated reactor contents that is pasteurized is from about 0.10 to about 0.50 of the volume of the influent to the first anaerobic reactor.

19. The process of claim 1, wherein solids concentration of the concentrated reactor contents ranges from about 3 to about 12 percent by weight.

20. The process of claim 1, wherein the leftover concentrated reactor contents has a solids concentration of less than 6 percent by weight.

21. An anaerobic process for digesting organic substrates comprising:
   digesting an organic substrate in a first anaerobic reactor to provide reactor contents comprising solids and liquid products of digestions;
   removing a portion of the reactor contents; and
   concentrating removed reactor contents by separating liquids;
   returning concentrated reactor contents to the first anaerobic reactor;
   pasteurizing leftover concentrated reactor contents by elevating the temperature by direct contact with a fluid; and
   digesting pasteurized reactor contents in a second anaerobic reactor.

22. In a waste facility, an anaerobic process for digesting organic substrates comprising:
   digesting an organic substrate in a first anaerobic reactor to provide reactor contents;
   removing a portion of the reactor contents;
   concentrating removed reactor contents by separating liquids;
   returning concentrated reactor contents to the first anaerobic reactor;
   pasteurizing leftover concentrated reactor contents; and
   digesting pasteurized reactor contents in a second anaerobic reactor.

23. An anaerobic process for digesting organic substrates comprising the following steps:
   digesting an organic substrate in a first anaerobic reactor to provide reactor contents comprising solids and liquid products of digestion;
   concentrating the reactor contents by removing liquids;
   pasteurizing digested concentrated reactor contents by direct contact with a fluid; and
   digesting concentrated reactor contents that underwent pasteurization in a second anaerobic reactor.

24. The process according to claim 23, further comprising adding chemical disinfectants to the fluid to improve pasteurization.

25. The process according to claim 23, wherein the fluid is at a suitable temperature to cause pasteurization.

26. The process according to claim 25, wherein the fluid is water, air, nitrogen, oxygen, methane, carbon dioxide or hydrogen.

27. The process according to claim 23, wherein the fluid is selected to cause cell lysis during the pasteurizing step.

28. The process according to claim 27, wherein the fluid is hydrogen sulfide, ammonia, ozone or oxygen.

29. The process according to claim 23, further comprising a step of removing inorganic or organic refractory solids from the reactor contents before the pasteurizing step.

30. The process according to claim 29, comprising the step of pasteurizing the inorganic or organic refractory solids from the first anaerobic reactor subsequent to their removal.

31. The process according to claim 23, further comprising the step of generating gases during the process and returning the gases to the process.

32. The process of claim 31, wherein the fluid comprises steam, water, air, nitrogen, oxygen, methane, carbon dioxide, hydrogen, hydrogen sulfide, ozone, biogas or ammonia.

33. The process of claim 23, wherein the fluid comprises a gaseous phase.

34. The process according to claim 33, wherein the gaseous phase is steam, air, nitrogen, oxygen, methane, ammonia, hydrogen, carbon dioxide, hydrogen sulfide, ozone or biogas.

35. The process according to claim 23, wherein the fluid comprises a liquid phase.

36. The process according to claim 35, wherein the liquid phase is water.

37. The process according to claim 23, wherein the fluid dilutes the concentrated reactor contents to a solids concentration less than about 6% by weight.

38. The process according to claim 23, wherein the first anaerobic reactor comprises a fixed film, sludge bed, sludge blanket, completely mixed, plug flow, phase separated, staged, carrier assisted, batch, or sequencing batch anaerobic reactor.

39. The process according to claim 38, wherein the first anaerobic reactor is operated at mesophilic, thermophilic, or psychrophilic temperatures.

40. The process according to claim 23, wherein the second anaerobic reactor comprises a fixed film, sludge bed, sludge blanket, completely mixed, plug flow, phase separated, staged, carrier assisted, batch, or sequencing batch anaerobic reactor.

41. The process according to claim 23, wherein the step of concentrating occurs in a separator selected from the group consisting of a clarifier, centrifuge, cyclone, plate separator, gravity belt, membrane, filter, flotation separator or a combination of such separators used with or without chemical, mechanical, or electrical flocculating aids.

42. The process according to claim 41, wherein the separator and the first anaerobic reactor are contained within the same vessel.

43. The process according to claim 23, wherein the step of pasteurizing is carried out in a pasteurization vessel and a retention vessel that may be separate vessels or incorporated into the same vessel.

44. The process according to claim 23, wherein the step of concentrating and the step of pasteurizing are carried out in the same vessel.

45. The process according to claim 23, wherein the volume of the concentrated reactor contents that is pasteurized is from about 0.10 to about 0.50 of the volume of the influent to the first reactor.

46. The process according to claim 23, wherein the solids concentration of the concentrated reactor contents ranges from about 3 to about 12% by weight.

* * * * *